3,500,093
DYNAMOELECTRIC MACHINE SALIENT POLE
ROTOR WITH COIL SUPPORTS
Eddie Wharton, Beaconsfield, and Fred Garnet Cutler, Fareham, England, assignors to Rotax Limited, London, England
Filed Feb. 5, 1968, Ser. No. 703,037
Int. Cl. H02k 3/48
U.S. Cl. 310—214        2 Claims

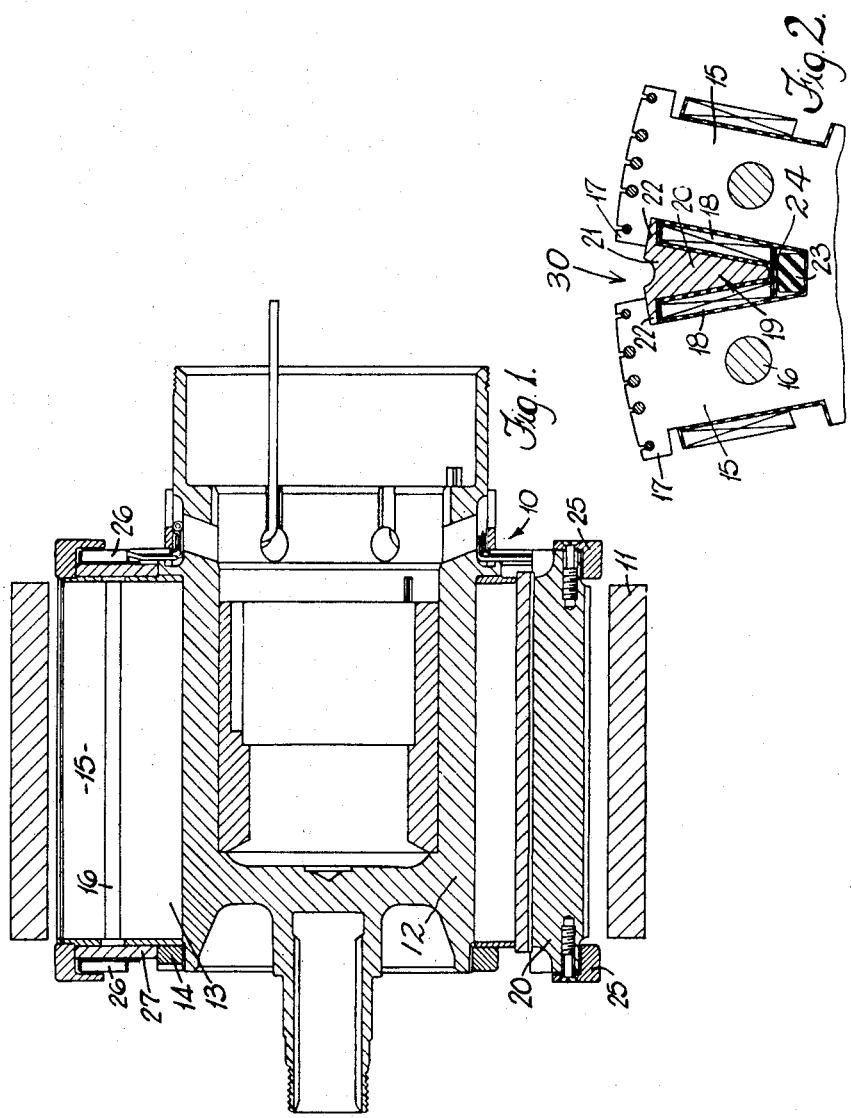

ABSTRACT OF THE DISCLOSURE

A dynamoelectric machine having a salient pole rotor in which the tips of the pole pieces extend circumferentially, the pole pieces having windings thereabout and including retaining members disposed in the slots defined between adjacent pole pieces, the retaining members having a wedge portion and an integral retaining portion the latter defining ears which bear against the ledges of the adjacent pole pieces and also including a wedge piece which is located between the retaining member and the base of the slot. The wedge piece acts to urge the ears into contact with the ledges and also urges the windings into contact with the ears.

---

This invention relates to dynamoelectric machines and of the kind comprising a rotor defining pole pieces having circumferential ledges, and windings surrounding the pole pieces respectively.

The object of the invention is to provide such a machine in a simple and convenient form.

According to the invention in a dynamoelectric machine of the kind specified the portions of the windings in the slots are retained therein by retaining members comprising a wedge shaped portion the sides of which bear against the windings and a retaining portion having circumferential ears which engage beneath the ledges respectively to retain the members in position within the slots, the members also acting to assist the flow of heat generated within the windings to the pole pieces.

In the accompanying drawings:

FIGURE 1 is a side elevation of one example of a dynamoelectric machine in accordance with the invention and FIGURE 2 is a section through a pair of pole pieces to an enlarged scale.

Referring to the drawings the dynamoelectric machine comprises a rotor structure 10 and a stator structure 11 upon which are mounted output windings (not shown). The rotor structure includes a shaft 12 upon which is mounted a stack of laminations 13 this being retained against a flange on the shaft by means of a ring 14. The laminations are shaped so that in assembly radial pole pieces 15 are defined and extending through the pole pieces are rivets 16 which serve to secure the parts of the laminations which form the pole pieces relative to each other.

Intermediate a pair of adjacent pole pieces is defined a slot 30 and each pole piece is provided with a pair of circumferential ledges 17. Each slot 30 accommodates portions 18 of windings which are wound around the adjacent pole pieces respectively. The windings are wound from tape and are located beneath the aforementioned ledges. For retaining the portions 18 of the windings within the slots 30, retaining members 19 are provided and these comprise an elongated wedge portion 20 and an integral retaining portion 21. The retaining portion 21 is provided with circumferential ears 22 which overhang the wedge portion and these engage behind the ledges 17 to retain the retaining members against outward movement when the rotor rotates. In order to locate the retaining members within the slots with the ears thereof adjacent the ledges and also to retain the portions 18 of the windings against the ears 22, wedge pieces 23 are positioned in the base of the slot and packing pieces 24 are provided intermediate the wedge pieces and the windings.

The ears 22 are shaped to contact the ledges 17 of the pole pieces and the windings are maintained in close contact with the side walls of the pole pieces and the retaining members. Furthermore, the material from which the retaining members is formed is a thermal conductor and preferably is also an electrical insulator. In use, during a temporary overload of the machine, the retaining members act as heat sinks to limit the temperature rise. However, even during normal use the retaining members act to conduct heat from the portions of the windings lying within the slots.

The retaining members 20 are longer than the stack of laminations and extend beyond the slots and the free ends thereof are supported by a pair of flanged banding rings 25 respectively which are secured by screws to the members. The rim portions of the banding rings also act to support the end portions 26 of the windings against the action of centrifugal force. Furthermore, the rim portions of the banding rings also support metal spacer members 27 which are positioned intermediate the end portion 26 of the windings and the end faces of the pole pieces. The spacer members 27 act to position the windings relative to the pole pieces and in addition act to conduct heat from the windings to the pole pieces.

It is the usual practice to impregnate the windings with a varnish to enhance the insulating properties by removing voids particularly in the overhanging portions 26 of the windings. Unfortunately the varnishes used also act as thermal insulators with the result that the interior of the windings can become dangerously heated during even temporary overloads. The provision of the retaining member minimises the problem as far as the portions of the windings lying within the slots are concerned and in order to overcome the problem with the overhanging portions, the voids in the latter are filled with a material which is both a good electrical insulator and also a good heat conductor. One example of such a material is magnesium oxide which is packed into the winding with a suitable binding agent after which the rotor structure is impregnated with varnish, the latter however does not penetrate the magnesium oxide to any substantial extent.

Having thus described our invention what we claim as new and desire to secure by Letters Patent is:

1. A dynamoelectric machine comprising a rotor, a plurality of pole pieces located about the rotor, adjacent pole pieces defining a slot therebetween, circumferential ledges formed on the pole pieces, the circumferential ledges on adjacent pole pieces overhanging the slot therebetween, a plurality of windings surrounding the pole pieces respectively, portions of said windings extending within said slots, retaining members mounted in said slots respectively, each retaining member comprising a wedge portion and an integral retaining portion, overhanging circumferential ears defined by the retaining portions, said ears being located between said ledges of the pole pieces and the windings, and the side walls of the wedge portion being in contact with the windings, and a wedge piece located intermediate the base of the slot and the retaining member and acting to urge the ears into contact with the ledges of the pole pieces and also acting to urge the windings into contact with the ears.

2. A dynamoelectric machine according to claim 1 in which the retaining members extend beyond the ends of the slots, the machine including a pair of banding rings, said banding rings being mounted at opposite ends of the rotor and encircling the extended portions of the retaining members, a pair of inwardly extending flanges formed integrally with the banding rings respectively, screws serving to retain the flanges and banding rings relative to the retaining members, and the voids in the end portions of the windings at opposite ends of the rotor being filled with mineral insulation.

References Cited

UNITED STATES PATENTS

| | | | |
|---|---|---|---|
| 434,206 | 8/1890 | Schmid | 310—269 |
| 992,548 | 5/1911 | Dandliker | 310—194 |
| 2,060,935 | 11/1936 | Grob | 310—215 X |
| 3,008,786 | 11/1961 | Costello | 310—214 |
| 3,151,260 | 9/1964 | MacCracken et al. | 310—260 X |
| 3,157,806 | 11/1964 | Wiedemann | 310—64 |

WARREN E. RAY, Primary Examiner

U.S. Cl. X.R.

310—270, 271